(12) United States Patent
Priebe et al.

(10) Patent No.: US 7,831,178 B2
(45) Date of Patent: **\*Nov. 9, 2010**

(54) PRINTING OF OPTICAL ELEMENTS BY ELECTROGRAPHY

(75) Inventors: Alan R. Priebe, Rochester, NY (US); Thomas N. Tombs, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 337 days.

This patent is subject to a terminal disclaimer.

(21) Appl. No.: 11/777,360

(22) Filed: Jul. 13, 2007

(65) Prior Publication Data

US 2009/0016757 A1   Jan. 15, 2009

(51) Int. Cl.
*G03G 15/01* (2006.01)

(52) U.S. Cl. ..................................... 399/231
(58) Field of Classification Search ............. 399/231, 399/298, 299, 301, 303
See application file for complete search history.

(56) References Cited

U.S. PATENT DOCUMENTS

| | | | |
|---|---|---|---|
| 2,955,035 A | 10/1960 | Walkup et al. | |
| 2,955,052 A | 10/1960 | Carlson et al. | |
| 3,121,009 A | 2/1964 | Giamo, Jr. | |
| 3,207,601 A | 9/1965 | Giamo, Jr. | |
| 3,589,290 A | 6/1971 | Walkup et al. | |
| 4,268,615 A | 5/1981 | Yonezawa | |
| 4,694,185 A | 9/1987 | Weiss | |
| 4,833,060 A | 5/1989 | Nair et al. | |
| 4,965,131 A | 10/1990 | Nair et al. | |
| 5,122,430 A | 6/1992 | Nishitsuji et al. | |
| 5,240,335 A | 8/1993 | Itoh et al. | |
| 5,543,964 A | 8/1996 | Taylor et al. | |
| 5,563,694 A | 10/1996 | Katayama | |
| 5,583,629 A * | 12/1996 | Brewington et al. | 399/302 |
| 5,583,694 A | 12/1996 | Takahashi et al. | |
| 5,707,684 A | 1/1998 | Hayes et al. | |
| 5,715,383 A | 2/1998 | Schindler et al. | |
| 5,745,152 A | 4/1998 | Vincent et al. | |
| 6,165,667 A | 12/2000 | Takagi et al. | |
| 6,421,522 B2 | 7/2002 | Henderson et al. | |
| 6,521,905 B1 | 2/2003 | Luxem et al. | |
| 6,591,747 B2 | 7/2003 | Buch et al. | |
| 6,663,103 B2 | 12/2003 | Dobberstein et al. | |
| 6,734,449 B2 | 5/2004 | Peter et al. | |
| 6,791,590 B2 | 9/2004 | Misaizu et al. | |

(Continued)

FOREIGN PATENT DOCUMENTS

DE   1002005010506   9/2006

(Continued)

OTHER PUBLICATIONS

Van H. DuBois and F.W. John, Eds., in Plastics, 5th Edition, Van-Norstrand and Reinhold, 1974 (p. 522).

*Primary Examiner*—Hoang Ngo
(74) *Attorney, Agent, or Firm*—Donna P. Suchy

(57) ABSTRACT

Electrographic printing of one or more optical elements having a particular profile by electrographic techniques. Such electrographic printing comprises the steps of forming a desired print image, electrographically, on a receiver member utilizing predetermined sized marking particles; and, where desired, forming one or more final optical elements utilizing marking particles of a predetermined size or size distribution.

22 Claims, 15 Drawing Sheets

U.S. PATENT DOCUMENTS

| | | |
|---|---|---|
| 6,795,250 B2 | 9/2004 | Johnson et al. |
| 6,885,830 B2 * | 4/2005 | Hirota et al. .................. 399/12 |
| 6,993,269 B2 | 1/2006 | Yamauchi et al. |
| 7,139,521 B2 | 11/2006 | Ng et al. |
| 2004/0033085 A1 | 2/2004 | Misaizu et al. |
| 2005/0169680 A1 | 8/2005 | Ng et al. |
| 2006/0133870 A1 | 6/2006 | Ng et al. |
| 2006/0187505 A1 | 8/2006 | Ng et al. |

FOREIGN PATENT DOCUMENTS

| | | |
|---|---|---|
| EP | 1392046 | 2/2004 |
| EP | 1676715 | 7/2006 |
| JP | 08063039 | 3/1996 |
| JP | 10224581 | 8/1998 |
| JP | 2002278370 | 9/2002 |
| JP | 2004074422 | 3/2004 |
| WO | WO 99/36830 | 7/1999 |
| WO | WO 2005/121893 | 12/2005 |
| WO | WO2008/082648 | 7/2008 |

* cited by examiner

PRINTING OF OPTICAL ELEMENTS BY ELECTROGRAPHY

FIELD OF THE INVENTION

This invention relates in general to electrographic printing, and more particularly to printing of raised toner to form one or more optical elements by electrography.

BACKGROUND OF THE INVENTION

One common method for printing images on a receiver member is referred to as electrography. In this method, an electrostatic image is formed on a dielectric member by uniformly charging the dielectric member and then discharging selected areas of the uniform charge to yield an image-wise electrostatic charge pattern. Such discharge is typically accomplished by exposing the uniformly charged dielectric member to actinic radiation provided by selectively activating particular light sources in an LED array or a laser device directed at the dielectric member. After the image-wise charge pattern is formed, the pigmented (or in some instances, non-pigmented) marking particles are given a charge, substantially opposite the charge pattern on the dielectric member and brought into the vicinity of the dielectric member so as to be attracted to the image-wise charge pattern to develop such pattern into a visible image.

Thereafter, a suitable receiver member (e.g., a cut sheet of plain bond paper) is brought into juxtaposition with the marking particle developed image-wise charge pattern on the dielectric member. A suitable electric field is applied to transfer the marking particles to the receiver member in the image-wise pattern to form the desired print image on the receiver member. The receiver member is then removed from its operative association with the dielectric member and the marking particle print image is permanently fixed to the receiver member typically using heat, pressure or and pressure. Multiple layers or marking materials can be overlaid on one receiver, for example, layers of different color particles can be overlaid on one receiver member to form a multi-color print image on the receiver member after fixing.

In the earlier days of electrographic printing, the marking particles were relatively large (e.g., on the order of 10-15 µm). As a result the print image had a tendency to exhibit relief (variably raised surface) appearance. Under most circumstances, the relief was considered an objectionable artifact in the print image. In order to improve image quality, and to reduce apparent relief, over the years, smaller marking particles (e.g., on the order of less than 8 µm) have been formulated and are more commonly used today. Relief is not always undesirable but to date printing documents with to form one or more optical elements using electrographic techniques has not been done as described.

SUMMARY OF THE INVENTION

In view of the above, this invention is directed to electrographic printing wherein toner forms one or more optical elements, with a particular profile, which can be printed by electrographic techniques. Such electrographic printing includes the steps of forming a desired raised toner shape, electrographically, on a receiver member utilizing predetermined sized marking particles in an area of the formed print image, where the desired optical element is formed utilizing toner particles having predetermined particle properties such as marking particles of a predetermined size distribution to form the optical elements.

The invention, and its objects and advantages, will become more apparent in the detailed description presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
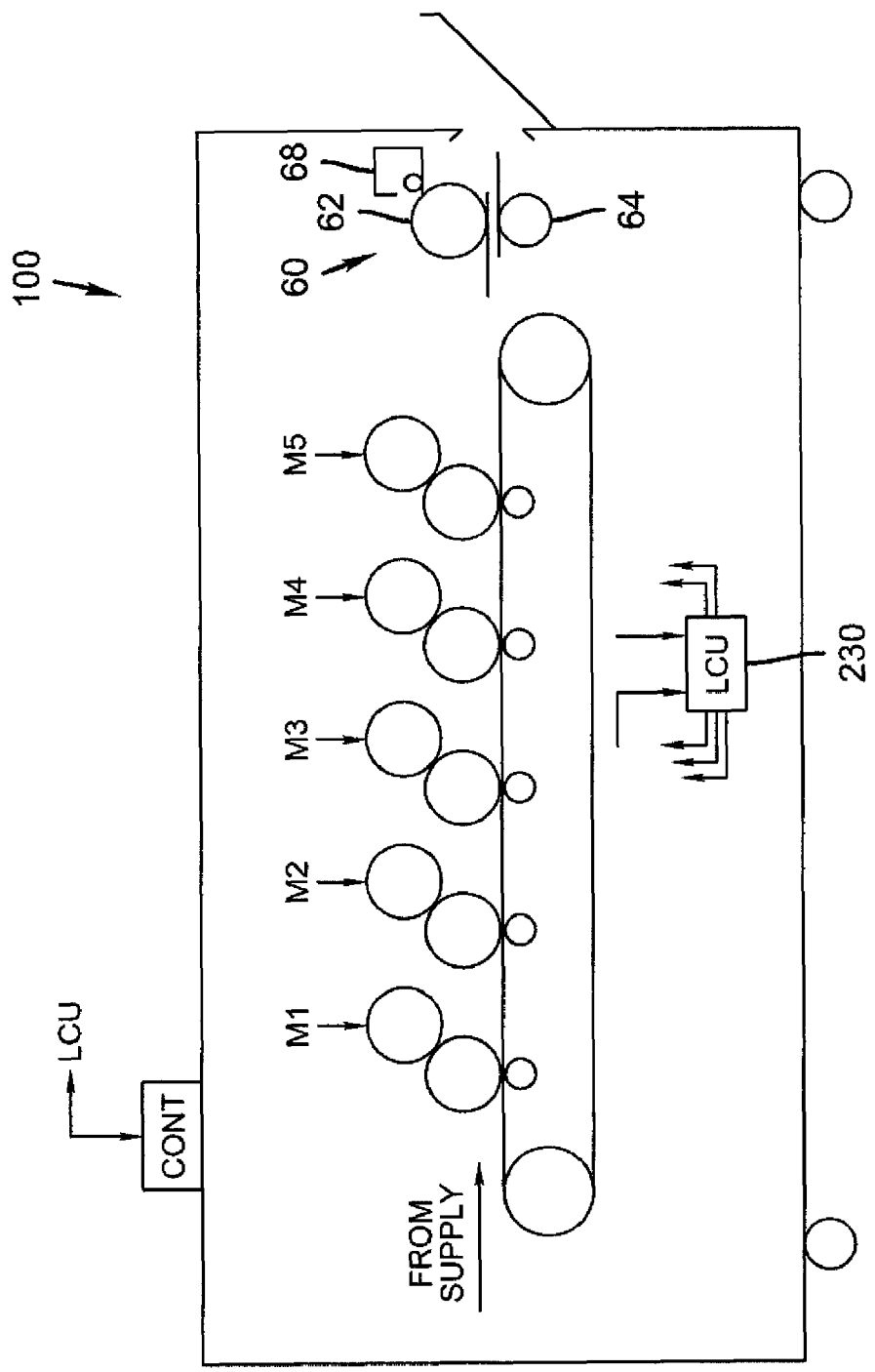
FIG. 1 is a schematic side elevational view, in cross section, of a typical electrographic reproduction apparatus suitable for use with this invention.
Figure 2:
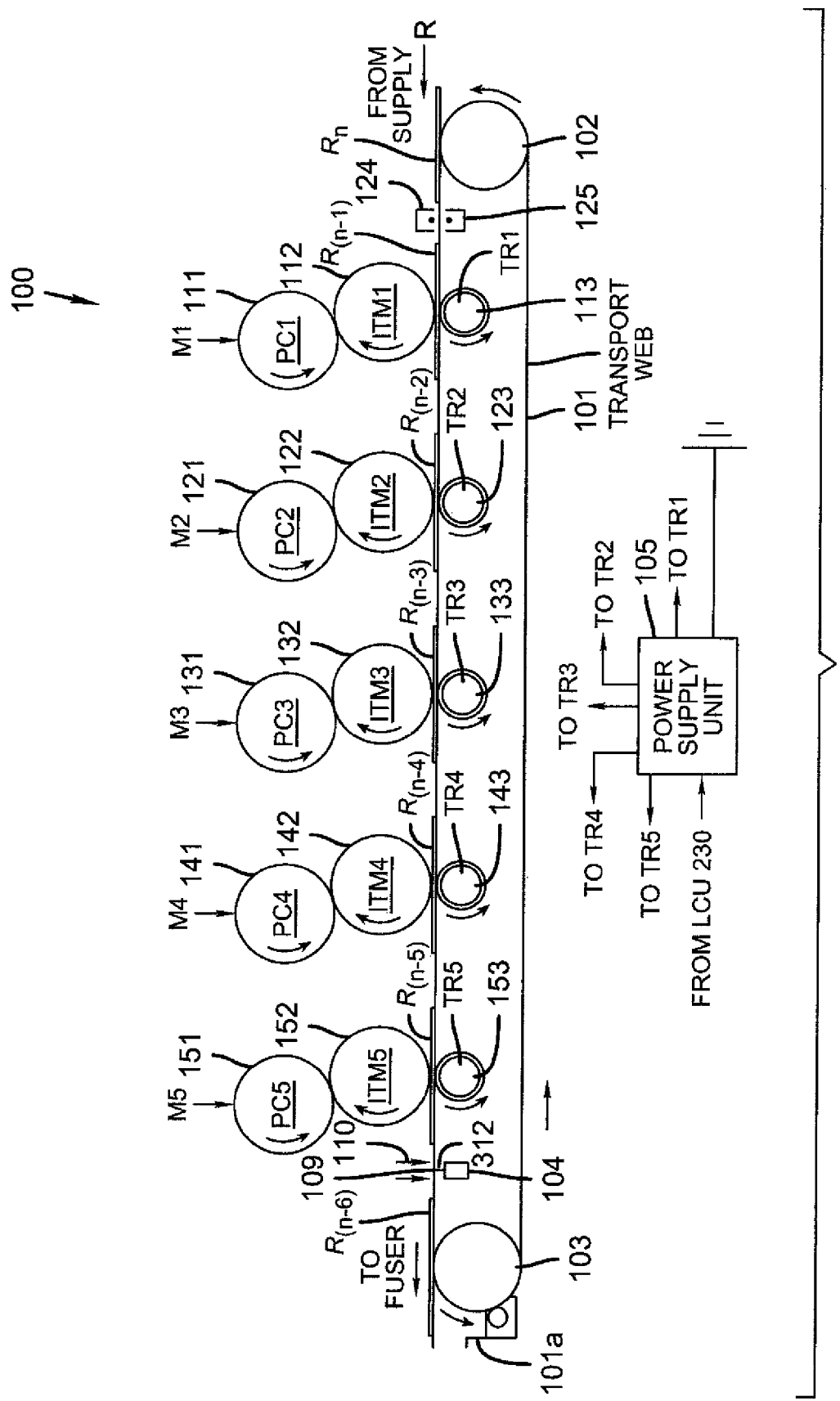
FIG. 2 is a schematic side elevational view, in cross section, of the reprographic image-producing portion of the electrographic reproduction apparatus of FIG. 1, on an enlarged scale.

Referring now to the accompanying drawings, FIGS. 1 and 2 are side elevational views schematically showing portions of a typical electrographic print engine or printer apparatus suitable for printing of pentachrome images. Although one embodiment of the invention involves printing using an electrophotographic engine having five sets of single color image producing or printing stations or modules arranged in tandem, the invention contemplates that more or less than five stations may be combined to deposit toner on a single receiver member, or may include other typical electrographic writers or printer apparatus.

An electrographic printer apparatus 100 has a number of tandemly arranged electrostatographic image forming printing modules M1, M2, M3, M4, and M5. Additional modules may be provided. Each of the printing modules generates a single-color toner image for transfer to a receiver member successively moved through the modules. Each receiver member, during a single pass through the five modules, can have transferred in registration thereto up to five single-color toner images to form a pentachrome image. As used herein, the term pentachrome implies that in an image formed on a receiver member combinations of subsets of the five colors are combined to form other colors on the receiver member at various locations on the receiver member, and that all five colors participate to form process colors in at least some of the subsets wherein each of the five colors may be combined with one or more of the other colors at a particular location on the receiver member to form a color different than the specific color toners combined at that location.

In a particular embodiment, printing module M1 forms black (K) toner color separation images, M2 forms yellow (Y) toner color separation images, M3 forms magenta (M) toner color separation images, and M4 forms cyan (C) toner color separation images. Printing module M5 may form a red, blue, green or other fifth color separation image. It is well known that the four primary colors cyan, magenta, yellow, and black may be combined in various combinations of subsets thereof to form a representative spectrum of colors and having a respective gamut or range dependent upon the materials used and process used for forming the colors. However, in the electrographic printer apparatus, a fifth color can be added to improve the color gamut. In addition to adding to the color gamut, the fifth color may also be used as a specialty color toner image, such as for making proprietary logos, or a clear toner for image protective purposes.

Receiver members ($R_n$-$R_{(n-6)}$ as shown in FIG. 2) are delivered from a paper supply unit (not shown) and transported through the printing modules M1-M5 in a direction indicated in FIG. 2 as R. The receiver members are adhered (e.g., preferably electrostatically via coupled corona tack-down chargers 124, 125) to an endless transport web 101 entrained and driven about rollers 102, 103. Each of the printing modules M1-M5 similarly includes a photoconductive imaging roller, an intermediate transfer member roller, and a transfer backup roller. Thus in printing module M1, a black color toner separation image can be created on the photoconductive imaging roller PC1 (111), transferred to intermediate transfer member roller ITM1 (112), and transferred again to a receiver member moving through a transfer station, which transfer station includes ITM1 forming a pressure nip with a transfer backup roller TR1 (113). Similarly, printing modules M2, M3, M4, and M5 include, respectively: PC2, ITM2, TR2 (121, 122, 123); PC3, ITM3, TR3 (131, 132, 133); PC4, ITM4, TR4 (141, 142, 143); and PC5, ITM5, TR5 (151, 152, 153). A receiver member, $R_n$, arriving from the supply, is shown passing over roller 102 for subsequent entry into the transfer station of the first printing module, M1, in which the preceding receiver member $R_{(n-1)}$ is shown. Similarly, receiver members $R_{(n-2)}$, $R_{(n-3)}$, $R_{(n-4)}$, and $R_{(n-5)}$ are shown moving respectively through the transfer stations of printing modules M2, M3, M4, and M5. An unfused image formed on receiver member $R_{(n-6)}$ is moving as shown towards a fuser of any well known construction, such as the fuser assembly 60 (shown in FIG. 1).

A power supply unit 105 provides individual transfer currents to the transfer backup rollers TR1, TR2, TR3, TR4, and TR5 respectively. A logic and control unit 230 (FIG. 1) includes one or more computers and in response to signals from various sensors associated with the electrophotographic printer apparatus 100 provides timing and control signals to the respective components to provide control of the various components and process control parameters of the apparatus in accordance with well understood and known employments. A cleaning station 101a for transport web 101 is also typically provided to allow continued reuse thereof.

Figure 3:
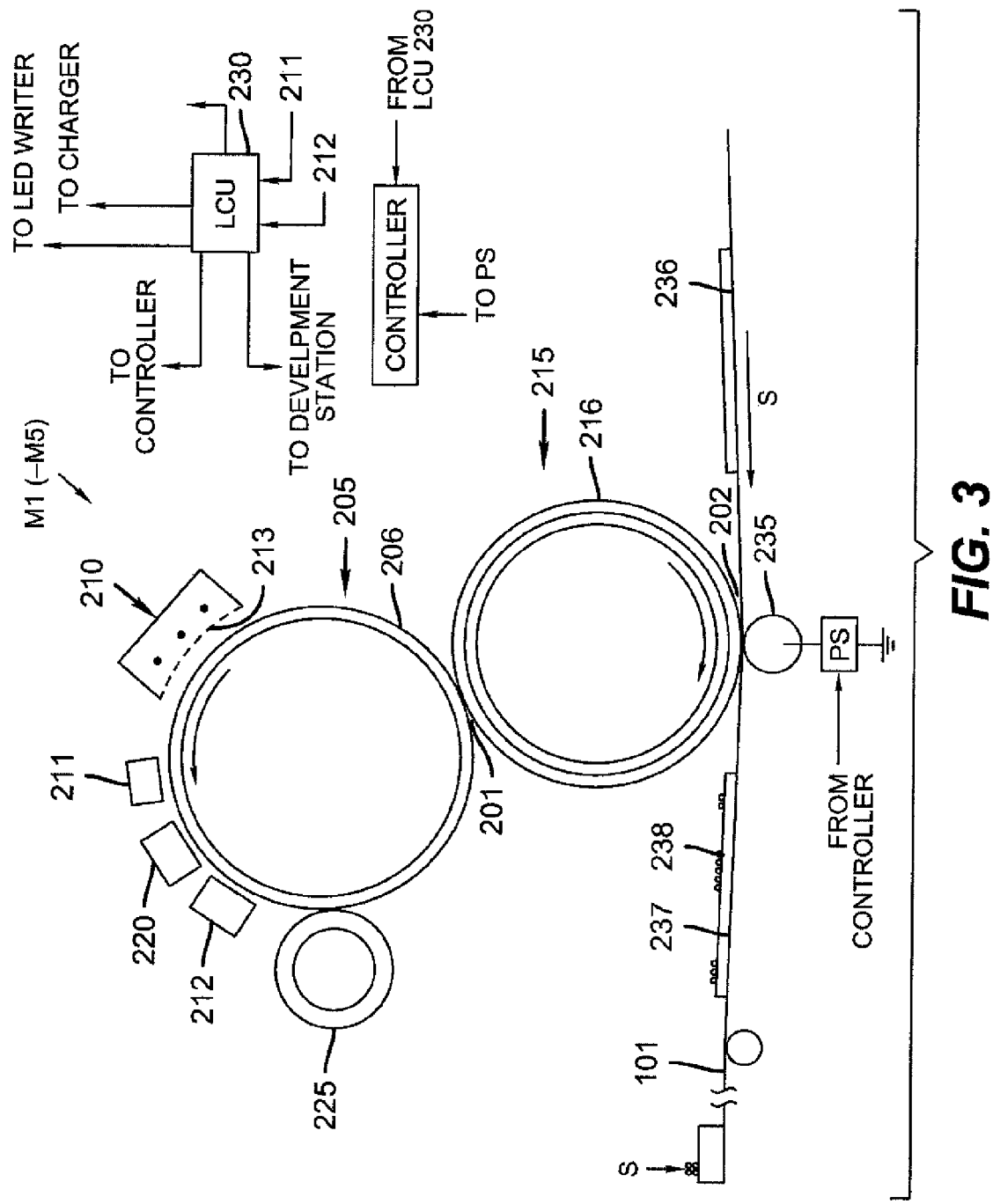
FIG. 3 is a schematic side elevational view, in cross section, of one printing module of the electrographic reproduction apparatus of FIG. 1, on an enlarged scale.

With reference to FIG. 3 wherein a representative printing module (e.g., M1 of M1-M5) is shown, each printing module of the electrographic printer apparatus 100 includes a plurality of electrographic imaging subsystems for producing one or more multilayered image or shape. Included in each printing module is a primary charging subsystem 210 for uniformly electrostatically charging a surface 206 of a photoconductive imaging member (shown in the form of an imaging cylinder 205). An exposure subsystem 220 is provided for image-wise modulating the uniform electrostatic charge by exposing the photoconductive imaging member to form a latent electrostatic multi-layer (separation) image of the respective layers. A development station subsystem 225 serves for developing the image-wise exposed photoconductive imaging member. An intermediate transfer member 215 is provided for transferring the respective layer (separation) image from the photoconductive imaging member through a transfer nip 201 to the surface 216 of the intermediate transfer member 215 and from the intermediate transfer member 215 to a receiver member (receiver member 236 shown prior to entry into the transfer nip and receiver member 237 shown subsequent to transfer of the multilayer (separation) image) which receives the respective (separation) images 238 in superposition to form a composite image thereon.

Subsequent to transfer of the respective (separation) multilayered images, overlaid in registration, one from each of the respective printing modules M1-M5, the receiver member is advanced to a fusing assembly across a space 109 to optionally fuse the multilayer toner image to the receiver member resulting in a receiver product, also referred to as a print. In the space 109 there may have a sensor 104 and an energy source 110. This can be used in conjunction to a registration reference 312 as well as other references that are used during deposition of each layer of toner, which is laid down relative to one or more registration references, such as a registration pattern.

The apparatus of the invention uses a clear, without any pigment, toner in one or more stations. The clear toner differs from the pigmented toner described above. It may have larger particle sizes from that described above. The multilayer (separation) images produced by the apparatus of the invention do not have to be indicia and are shown as made up entirely of clear toner having one or more layers. Alternately the image 238 could be a colored toner and be indicia followed by other layers that include clear or colored toner as will be discussed in more detail later. The layers of clear toner can each have the same or different indices of refraction. Another embodiment would tint or coat some or all of the clear toner in such a way that it acted as a filter.

Associated with the printing modules 200 is a main printer apparatus logic and control unit (LCU) 230, which receives input signals from the various sensors associated with the printer apparatus and sends control signals to the chargers 210, the exposure subsystem 220 (e.g., LED writers), and the development stations 225 of the printing modules M1-M5. Each printing module may also have its own respective controller coupled to the printer apparatus main LCU 230.

Subsequent to the transfer of the multiple layer toner (separation) images in superposed relationship to each receiver member, the receiver member is then serially de-tacked from transport web 101 and sent in a direction to the fusing assembly 60 to fuse or fix the dry toner images to the receiver member. This is represented by the five modules shown in FIG. 2 but could include only one module and preferably anywhere from two to as many as needed to achieve the desired results including the desired final optical elements. The transport web is then reconditioned for reuse by cleaning and providing charge to both surfaces 124, 125 (see FIG. 2) which neutralizes charge on the opposed surfaces of the transport web 101.

The electrostatic image is developed by application of marking particles (toner) to the latent image bearing photoconductive drum by the respective development station 225. Each of the development stations of the respective printing modules M1-M5 is electrically biased by a suitable respective voltage to develop the respective latent image, which voltage may be supplied by a power supply or by individual power supplies (not illustrated). Preferably, the respective developer is a two-component developer that includes toner marking particles and carrier particles, which could be magnetic. Each development station has a particular layer of toner marking particles associated respectively therewith for that layer. Thus, each of the five modules creates a different layer of the image on the respective photoconductive drum. As will be discussed further below, a pigmented (i.e., color) toner development station may be substituted for one or more of the non-pigmented (i.e., clear) developer stations so as to operate in similar manner to that of the other printing modules, which deposit pigmented toner. The development station of the clear toner printing module has toner particles associated respectively therewith that are similar to the color marking particles of the development stations but without the pigmented material incorporated within the toner binder.

With further reference to FIG. 1, transport belt 101 transports the toner image carrying receiver members to an optional fusing or fixing assembly 60, which fixes the toner particles to the respective receiver members by the application of heat and pressure. More particularly, fusing assembly 60 includes a heated fusing roller 62 and an opposing pressure roller 64 that form a fusing nip therebetween. Fusing assembly 60 also includes a release fluid application substation generally designated 68 that applies release fluid, such as, for example, silicone oil, to fusing roller 62. The receiver members or prints carrying the fused image are transported seriatim from the fusing assembly 60 along a path to either a remote output tray, or is returned to the image forming apparatus to create an image on the backside of the receiver member (to form a duplex print).

Print providers and customers alike have been looking at ways to expand the use of electrographically produced prints to include a multidimensional shape, specifically a shape or shapes that effect the transfer of light through the surface of a print. This can be used in close registration with a printed image described below to print a multiple layered images to which when observed by an observer standing in multiple spots is used to create a desired effect. The multilayered shape can be an optical element, for example be a lenslet type shape for directing light or other purposes. One lenslet is in the form of a lenticular lens, in which an array of lenslets overlies a visible image that is divided in the same manner as the array. Typically the image is divided into stripes corresponding to striped lenslets. Sets of stripes differ slightly to provide apparent motion or an appearance of depth. A shortcoming of lenticular images has been the difficulty of assembling a sheet of lenslets and an image print. Registration is provided using registration references.

The registration references are reference patterns 150, which could be a single mark or a pattern or collection of marks in a predetermined arrangement, hereto referred to as a reference pattern. In a particular embodiment the reference pattern is a lenticular image or other printed two-dimensional image. The reference pattern can combine a printed image and one or more registration marks. A printed image can also be provided, in addition to the registration pattern or coincident with one. In embodiments discussed herein the registration pattern is part of the completed output product or print. As an alternative, the registration pattern is positioned separate from the completed output print.

The reference pattern can be printed by any convenient means such as another printer procedure with the limitation that the receiver member must be compatible with the method of the invention. The registration pattern can also be provided as a toner first layer in the same manner as the other toner layers are laid down. The registration pattern can be indicia such as a letter or number, figure, mark in a figure or indicia, or a pattern of raised print. The registration pattern can also be invisible to the naked eye such as an infrared, ultraviolet, chemically detectable indicia or a watermark. The registration pattern could be, for example, a physical feature, such as two corners of the receiver. The clear raised print could be also registered in relation to color attributes if the clear layers of toner are used with color layers as will be discussed later.

Figure 4:
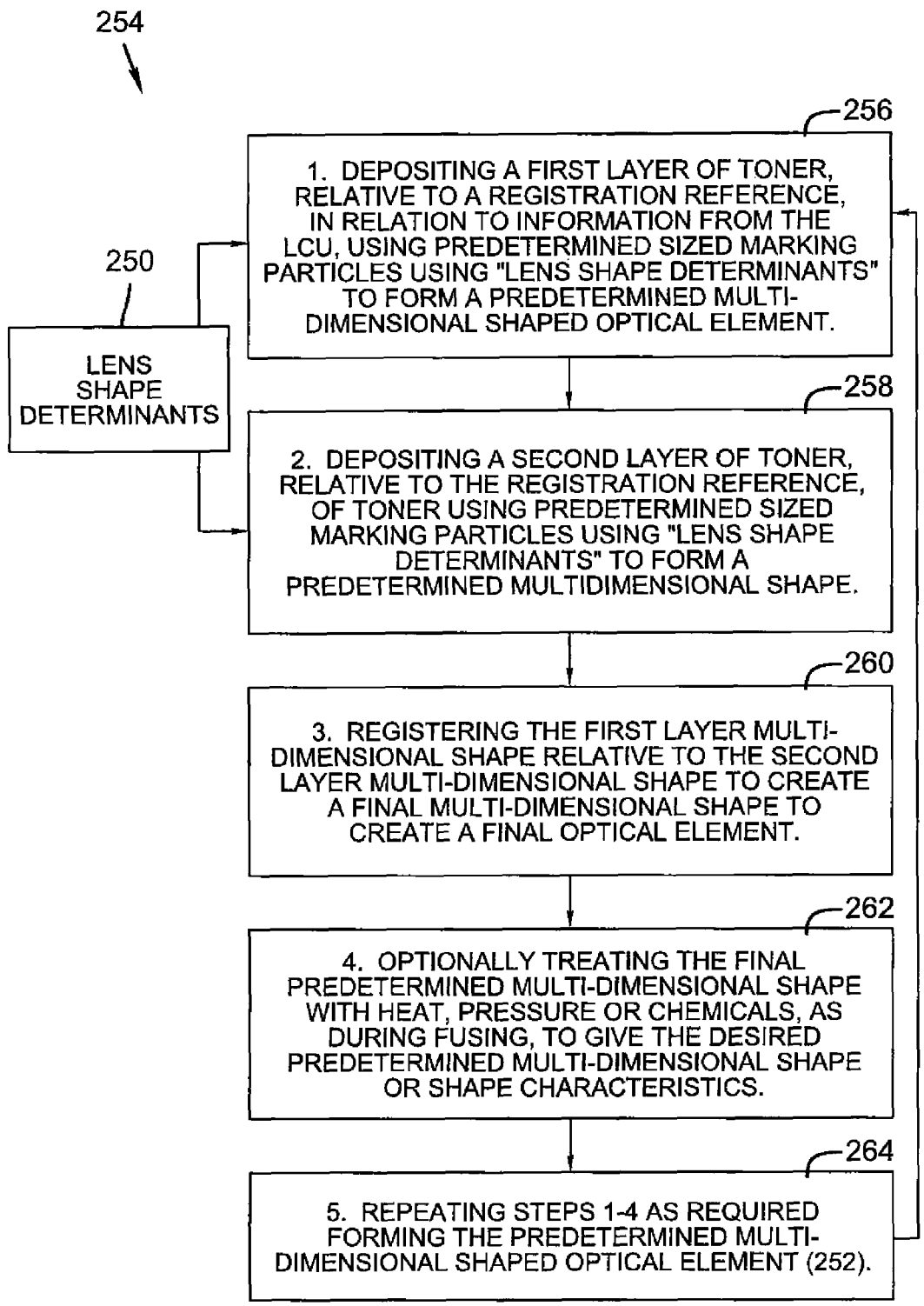
FIG. 4 is an embodiment of a method printing an optical element upon a receiver.

In one embodiment, as shown in FIGS. 3 and 4, all layers have clear toner of the same or different indices of refraction to produce an optical element having a final predetermined multi-dimensional shape S. The optical element is prepared using the electrostatographic printing apparatus 100 for forming a toner image upon a receiver, the apparatus including an imaging member 205, a development station 225 for depositing two or more layers of toner using predetermined size marking particles having predetermined particle properties, referred to herein in relation to clear toner as a "lens shape determinants" 250 used to form a predetermined multi-dimensional shape 252 by the method shown in FIG. 4. The multilayer of clear or, as discussed later, clear and pigmented toner, can be obtained by a number of ways including multiple station lay downs, multiple stations and passes through those stations in registration to each other and/or replacing one or more pigmented station with a clear station, such as replacing the K station. The method of printing can be variable, such as sheet to sheet or within one sheet as well area dependent. For instance there is an ability to spot a lens only in specified areas of a page or receiver giving the ability to create 3-D images, as will be described below, as well as 2-D images on the same sheet simultaneously.

In a particular embodiment the method 254 for electrographic printing of raised multidimensional toner shapes upon the receiver includes a first step 256 is to deposit a first layer of toner, relative to a registration reference, in relation to information from the LCU, using predetermined sized marking particles using the chosen "lens shape determinants" to form each layer, in this case a first part or layer of a predetermined multidimensional shape. In a next step 258 a second layer of toner is deposited, relative to the registration pattern, using predetermined sized marking particles having the chosen lens shape determinants necessary to form a second part or layer of the predetermined multi-dimensional shape. In a third step 260 the first layer multi-dimensional shape is registered relative to the second layer multi-dimensional shape to create a final optical element having a multi-dimensional shape. Steps 1-4 can be repeated 264 as required to form the predetermined multidimensional shape 252.

Optionally the final predetermined multi-dimensional shape may be treated 262 with heat, pressure or chemicals, as during fusing, to modify the optical element and give the desired predetermined optical element or shape characteristics desired. Also shown in FIG. 4 the first layer multi-dimensional shape is registered to the second layer multi-dimensional shape 260, which is necessary to create a final multi-dimensional shape 252. The logic and control unit, also referred to as a controller, 230 controls the application of each layer to form the optical element with the multi-dimensional shape S along with a treatment device, such as a fuser assembly 60, for treating to give the final optical element.

The logic and control unit (LCU) 230 shown in FIG. 3 includes a microprocessor incorporating suitable look-up tables and control software, which is executable by the LCU 230. The control software is preferably stored in memory associated with the LCU 230. Sensors associated with the fusing assembly provide appropriate signals to the LCU 230. In response to the sensors, the LCU 230 issues command and control signals that adjust the heat and/or pressure within fusing nip 66 and otherwise generally nominalizes and/or optimizes the operating parameters of fusing assembly 60 for imaging substrates.

Image data for writing by the printer apparatus 100 may be processed by a raster image processor (RIP), which may include either a layer or a color separation screen generator or generators. For both a clear and a colored layered image case, the output of the RIP may be stored in frame or line buffers for transmission of the separation print data to each of respective LED writers, for example, K, Y, M, C, and L (which stand for black, yellow, magenta, cyan, and clear respectively, or alternately multiple clear layers $L_1$, $L_2$, $L_3$, $L_4$, and $L_5$. The RIP and/or separation screen generator may be a part of the printer apparatus or remote therefrom. Image data processed by the RIP may be obtained from a multilayer document scanner such as a color scanner, or a digital camera or generated by a computer or from a memory or network which typically includes image data representing a continuous image that needs to be reprocessed into halftone image data in order to be adequately represented by the printer. The RIP may perform image processing processes including layer corrections, etc. in order to obtain the desired final shape on the final print. Image data is separated into the respective layers, similarly to separate colors, and converted by the RIP to halftone dot image data in the respective color using matrices, which include desired screen angles and screen rulings. The RIP may be a suitably programmed computer and/or logic devices and is adapted to employ stored or generated matrices and templates for processing separated image data into rendered image data in the form of halftone information suitable for printing.

Figure 5:
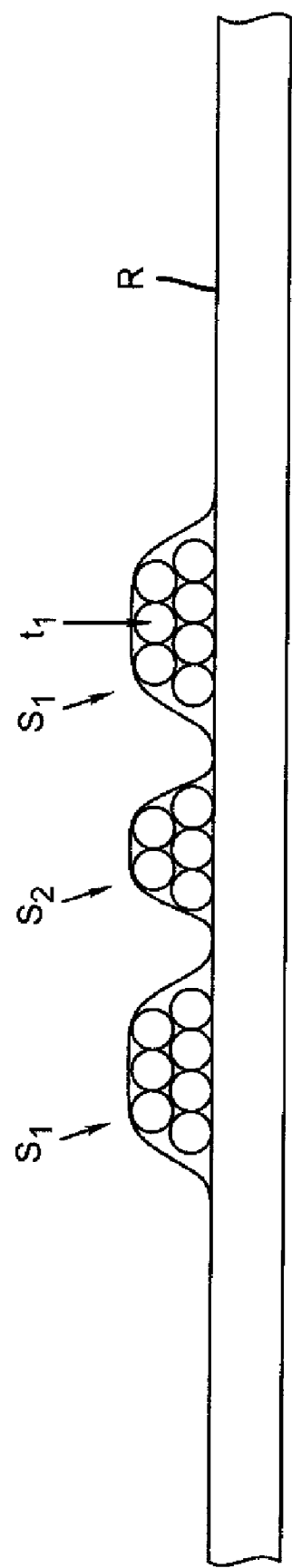
FIG. 5 is a schematic side elevational view, in cross section, of a print produced by the method of FIG. 4, having predetermined optical elements formed thereon.
Figure 6:
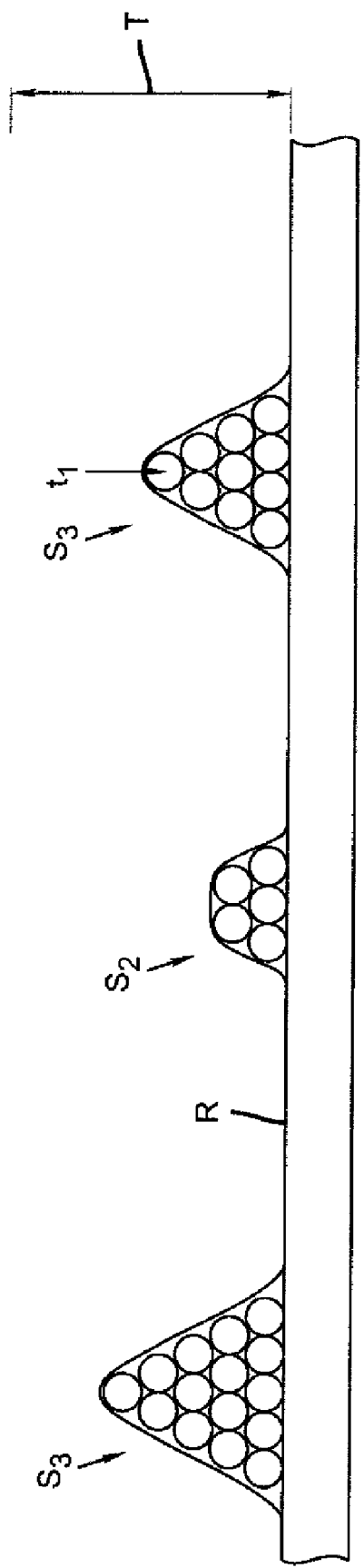
FIG. 6 is a schematic side elevational view, in cross section, of another print, produced by the method of FIG. 4, having the predetermined multidimensional shape formed in layers sufficient to form the final predetermined optical elements.

According to this invention, a desired optical element having a particular profile or shape S can be printed by electrographic techniques including the steps of forming a desired final predetermined raised multidimensional shape, electrographically, on a receiver member R utilizing marking particles having predetermined size properties. The size properties can include a specific size $t_1$, size distribution and or other properties such as packing and porosity. In a particular embodiment the particle size is substantially larger size then the range of particle sizes currently used in commercial color toners. The selected marking particles are used to form a predetermined multidimensional shape as shown in FIG. 5. This can be accomplished with an electrographic reproduction apparatus, such as the apparatus 100 discussed above by controlling the stack height T of toner particles t on a receiver member $R_n$ (see FIGS. 6-7).

When printing optical elements, having raised multidimensional toner shapes, with a different sized toner particle set, including different sized particles that can result in a greater packing of particles, in one electrographic module it may be advantageous to alter one or more electrographic process set-points, or operating algorithms, to optimize performance, reliability, and/or image quality of the resultant print. These set-points include development potential and other transfer process set-points that may be used to control the height, shape and other features of the final optical element. An example of a different sized toner particle set is a toner having a continuous size distribution with two or more discreet, separated and relatively large peaks. Mixing two or more toners having particles with appropriate sizes, that is, appropriate ranges of particle size, can produce such a set. This size variables include particle size, particle distribution and multiple sizes, as in multiple distributions of particle sizes as indicated by a distribution with multiple peaks. These would have standard packing. The packing could be varied to enhance the desired effect and the optimum packing can be determined as needed. Examples of electrographic processes set-point (operating algorithms) values that may be controlled in the electrographic printer to alternate predetermined values when printing raised multidimensional toner shapes include, for example: fusing temperature, fusing nip width, fusing nip pressure, imaging voltage on the photoconductive member, toner particle development voltage, transfer voltage and transfer current. In an electrographic apparatus that makes prints with print raised multidimensional toner shaped images, including optical elements, a special mode of operation may be provided where the predetermined set points (implemented as control parameters or algorithms) are used when printing the optical elements. That is, when the electrographic printing apparatus prints non-raised multidimensional toner shaped images, a first set of set-points/control parameters are utilized. Then, when the electrographic printing apparatus changes mode to print raised multidimensional toner shaped images, a second set of set-points/control parameters are utilized. Set points for use with particular toner or toners can be determined heuristically.

The final multi-dimensional shape for an optical element has a specific height and profile including radius of curvature, and refractive index so that the shapes can result in the printing of a range of optical elements, including various lens shapes. The different sized toner particle set, including the different sized particles that can result in a greater packing of particles are controlled to yield those shapes.

Some of the "lens shape determinants", include a particular size distribution of marking particles. Additional "lens shape determinants" include permanence, clarity, color, form, surface roughness, smoothness, color clarity and refractive index. Additionally other predetermined particle properties can be "lens shape determinants" including one or more of the following: toner viscosity, color, density, surface tension, melting point and finishing methods including the use of fusing and pressure rollers.

The toner used to form the final optical elements can be styrenic (styrene butyl acrylate) type used in toner with a polyester toner binder. In that use typically the refractive index of the polymers used as toner resins have a refractive index of 1.53 to almost 1.60. These are typical refractive index measurements of the polyester toner binder, as well as styrenic (styrene butyl acrylate) toner. Typically the polyesters are around 1.54 and the styrenic resins are 1.59. The conditions under which it was measured (by methods known to those skilled in the art) are at room temperature and about 590 nm. One skilled in the art would understand that other similar materials could also be used. These could include both thermoplastics such as the polyester types and the styrene acrylate types as well as PVC and polycarbonates, especially in high temperature applications such as projection assemblies. One example is an Eastman Chemical polyester-based resin sheet, Lenstar™, specifically designed for the lenticular market. Also thermosetting plastics could be used, such as the thermosetting polyester beads prepared in a PVA1 stabilized suspension polymerization system from a commercial unsaturated polyester resin at the Israel Institute of Technology.

The toner used to form the final predetermined shape is affected by the size distribution so a closely controlled size and shape is desirable. This can be achieved through the grinding and treating of toner particles to produce various resultants sizes. This is difficult to do for the smaller particular sizes and tighter size distributions since there are a number of fines produced that must be separated out. This results in either poor distributions and/or very expensive and a poorly controlled processes. An alternative is to use a limited coalescence and/or evaporative limited coalescence techniques that can control the size through stabilizing particles, such as silicon. These particles are referred to as chemically prepared dry ink (CDI) below. Some of these limited coalescence techniques are described in patents pertaining to the preparation of electrostatic toner particles because such techniques typically result in the formation of toner particles having a substantially uniform size and uniform size distribution. Representative limited coalescence processes employed in toner preparation are described in U.S. Pat. Nos. 4,833,060 and 4,965,131, these references are hereby incorporated by reference.

In the limited coalescence techniques described, the judicious selection of toner additives such as charge control agents and pigments permits control of the surface roughness of toner particles by taking advantage of the aqueous organic interphase present. It is important to take into account that any toner additive employed for this purpose that is highly surface active or hydrophilic in nature may also be present at the surface of the toner particles. Particulate and environmental factors that are important to successful results include the toner particle charge/mass ratios (it should not be too low), surface roughness, poor thermal transfer, poor electrostatic transfer, reduced pigment coverage, and environmental effects such as temperature, humidity, chemicals, radiation, and the like that affects the toner or paper. Because of their effects on the size distribution they should be controlled and kept to a normal operating range to control environmental sensitivity.

This toner also has a tensile modulus ($10^3$ psi) of 350-600, normally 345, a flexural modulus ($10^3$ psi) of 300-500, normally 340, a hardness of M70-M72 (Rockwell), a thermal expansion of 68-70 $10^{-6}$/degree Celsius, a specific gravity of 1.2 and a slow, slight yellowing under exposure to light.

This toner also has a tensile modulus ($10^3$ psi) of 150-500, normally 345, a flexural modulus ($10^3$ psi) of 300-500, normally 340, a hardness of M70-M72 (Rockwell), a thermal expansion of 68-70 $10^{-6}$/degree Celsius, a specific gravity of 1.2 and a slow, slight yellowing under exposure to light according to J. H. DuBois and F. W. John, eds., in Plastics, $5^{th}$ edition, Van Norstrand and Reinhold, 1974 (page 522).

In this particular embodiment various attributes make the use of this toner a good toner to use. In any contact fusing the speed of fusing and resident times and related pressures applied are also important to achieve the particular final desired optical element. Contact fusing may be necessary if faster turnarounds are needed. Various finishing methods would include both contact and non-contact including heat, pressure, chemical as well as IR and UV.

The described toner normally has a melting range can be between 50-300 degrees Celsius. Surface tension, roughness and viscosity should be such as to yield a spherical not circular shape to better transfer. Surface profiles and roughness can be measured using the Federal 5000 "Surf Analyzer' and is measured in regular unites, such as microns. Toner particle size, as discussed above is also important since larger particles not only result in the desired heights and shapes but also results in a clearer optical element since there is less air inclusions, normally, in a larger particle. Color density is measured under the standard CIE test by Gretag-Macbeth in calorimeter and is expressed in L*a*b* units as is well known. Toner viscosity is measured by a Mooney viscometer, a meter that measures viscosity, and the higher viscosities will keep an optical element's shape better and can result in greater height. The higher viscosity toner will also result in a retained form over a longer period of time.

Melting point is often not as important of a measure as the glass transition temperature (Tg), discussed above. This range is around 50-100 degrees Celsius, often around 60 degrees Celsius. Permanence of the color and/or clear under UV and IR exposure can be determined as a loss of clarity over time. The lower this loss, the better the result. Clarity, or low haze, is important for optical elements that are transmissive or reflective wherein clarity is an indicator and haze is a measure of higher percent of transmitted light.

These lens shape determinants can be determined experimentally in the laboratory, as described here, or can be developed over time during usage. Furthermore, a library of such lens shape determinants may be built up over time for use whenever an operator wishes to print a final optical element, as discussed above.

In a particular embodiment the basic premise for producing optical elements on top of a "flat" image is that the final optical elements will include a toner particle stack height T of at least 20 μm. The stack height T can be produced by selectively building up layer upon layer of toner particles $t_1$ of a standard general average mean volume weighted diameter of less than 9 μm, where each layer has a lay down coverage of about 0.4 to 0.5 mg/cm² for one or more shapes shown here as $S_3$ and $S_1$ shapes (see FIG. 6). When referring to toner particles, the toner size or diameter is defined in terms of the mean volume weighted diameter as measured by conventional diameter measuring devices such as a Coulter Multisizer, sold by Coulter, Inc. The mean volume weighted diameter is the sum of the mass of each toner particle multiplied by the diameter of a spherical particle of equal mass and density, divided by the total particle mass.

Figure 7:
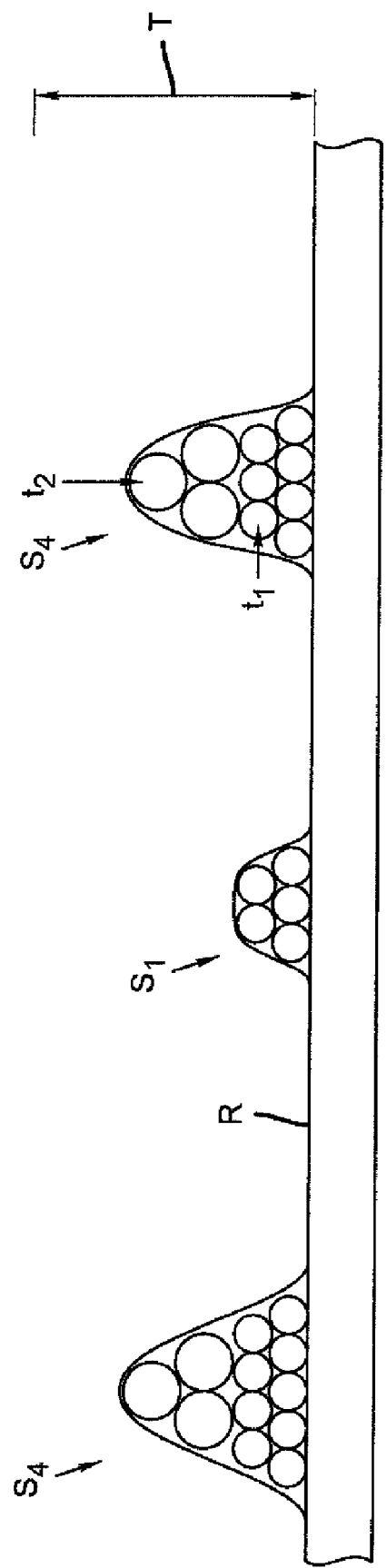
FIG. 7 is a schematic side elevational view, in cross section, of a print, produced by a modification of the method of FIG. 4, having a predetermined multidimensional parabolic shape to form the final predetermined optical elements.

Alternatively, several layers of the standard size toner particles $t_1$ can be selectively covered in the desired raised multidimensional toner shape with respect to the desired location with layers of toner particles $t_2$, of a larger general average mean volume weighted diameter of 12-30 μm (see FIG. 7). The larger toner particles are preferably completely clear of pigment and have a lay down coverage of at least 2 mg/cm², shown here as $S_4$ and $S_1$ shapes. As discussed above, the final predetermined raised multidimensional shape S, shown here as $S_1$ and $S_2$ shapes, can have various applications such as, for example, providing foreground or primary lens to giving documents a security feature, or providing multidimensional images when viewed from a variety of angles and in different light. From a side view FIG. 7 clearly shows a generally parabolic shape that allows the dimensional shape when placed over an image, when sequentially viewed from a variety of angles, to appear to move.

The height of the various layers is a factor in the formation of the desired raised multidimensional toner shape. After each layer is laid down the height can be read and the remaining heights recalculated based on the lens shape determinants information on the toner to be used to determine if a height correction should be made to the remaining layers as they are laid down or if alternate layers should be applied in conjunction with alternate finishing methods, such as a reduced heat fixing step. Alternatively the height checks can occur after each pass in a multipass system to help achieve the desired raised multidimensional toner shape. These determinations are most easily made in relation to the registration pattern but could be made randomly if appropriate.

U.S. Pat. No. 6,421,522, assigned to Eastman Kodak, describes one method and apparatus for setting registration in a multi-color machine having a number of exposure devices so that accurate registration patterns and thus toner location is achieved as necessary in the current application. This patent specifically addresses the effects of toner profile on registration and is incorporated by reference. Additional necessary components provided for control may be assembled about the various process elements of the respective printing modules (e.g., a meter 211 for measuring the uniform electrostatic charge, a meter 212 for measuring the post-exposure surface potential within a patch area of a patch latent image formed from time to time in a non-image area on surface 206, etc). Further details regarding the electrographic printer apparatus 100 are provided in U.S. Patent Publication No. 2006/0133870, published on Jun. 22, 2006, in the name of Yee S. Ng et al.

In another embodiment, another self-alignment method is used in order to build 3D structure with multiple passes. This method includes the following steps:

(a) After four color imaging, the fifth station using a higher glass transition temperature (Tg) clear toner, such as chemically prepared dry ink, to form a counter channel that a lenticular material can go into later (self-alignment) in subsequent passes. For example 1-D ridges 20-40 um high can be spaced about 6 pixels apart (~258 um). The ridges have some width (around 2 pixels wide—~86 um to 100 um). In one particular embodiment a 20-40 um chemically prepared dry ink (CDI) could be used in conjunction with non-contact fusing (radiant/flash etc) to form ridges. The CPD is described in U.S. Pat. Nos. 4,833,060 and 4,965,131, assigned to Eastman Kodak.

(b) In sequential multiple passes, one may be able to lay down enough lower Tg CDI material (say 100-150 um and may be even gray level imaging to form the lens material). When fusing, using a lower fusing temperature, so the ridge material does not melt, then even if the lower Tg material does not align with color images below, the fact that a line of trough exists and with wetting of the melted lower Tg CDI, perhaps the lower Tg material will flow into the trough by wetting and gravity and form a 3-D dome-shaped lens aligned with the troughs below to form lenticular lens. In one particular embodiment, all five stations use the CDI with a lower Tg than the ridge material.

Figure 8:
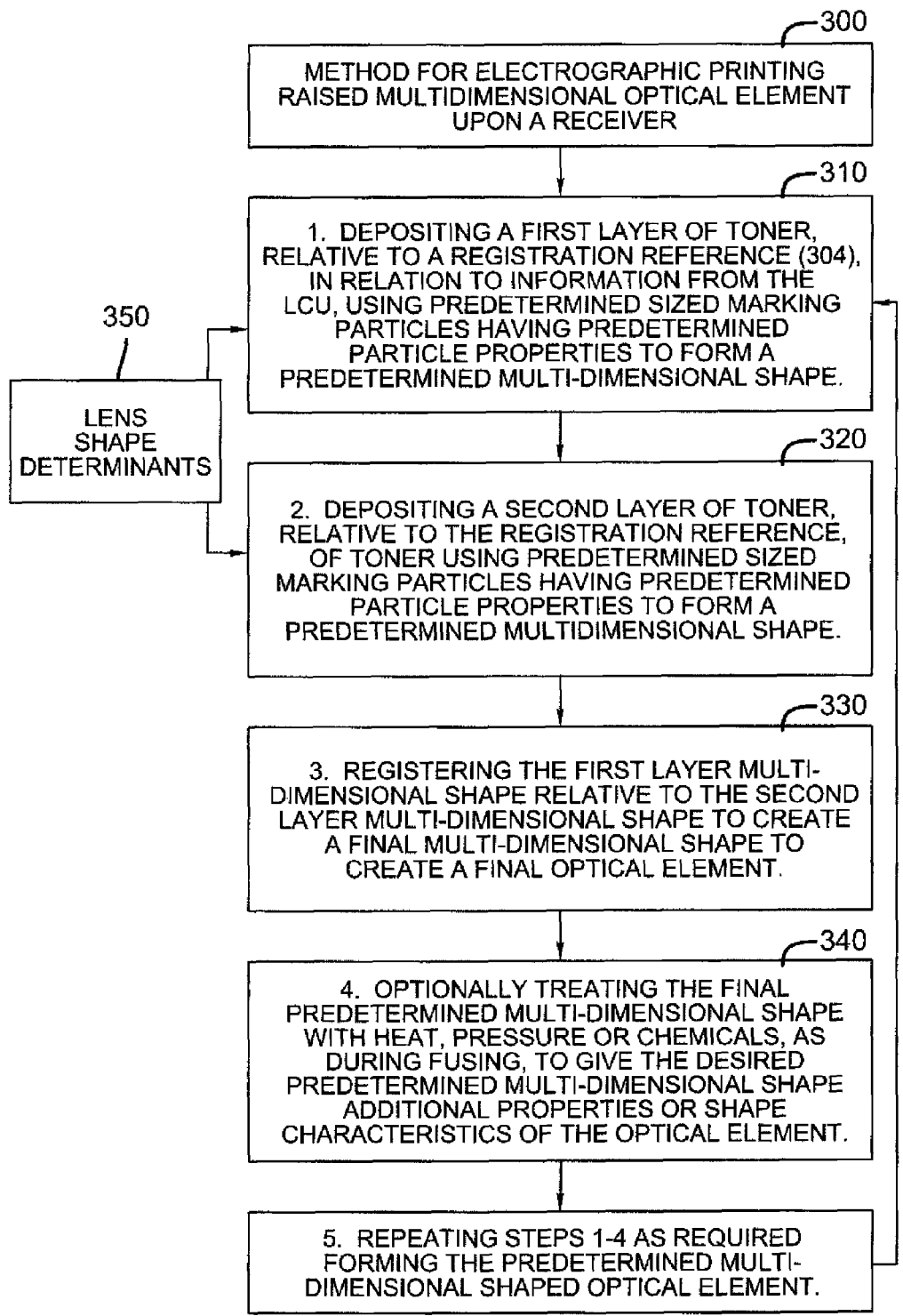
FIG. 8 is an embodiment of a method printing a multidimensional shape upon a receiver.

In one embodiment, as shown in FIG. 8, the method for electrographic printing raised multidimensional toner shape as an optical element upon a receiver 300, includes the steps of depositing a first layer of toner 310, relative to a registration reference 312, using predetermined sized marking particles having predetermined particle properties to form a predetermined multidimensional shape S; depositing one or more additional layers of toner 320, relative to the registration reference, such as the registration patterns or marks, using predetermined sized marking particles and registering the first layer multi-dimensional shape relative to the second layer multi-dimensional shape to create a final multi-dimensional shape 330 with optional treatment 340. The final predetermined multi-dimensional shape can be treated and fixed, such as fusing with heat and/or pressure during fusing, to give the final optical element.

The predetermined particle properties which are also referred to as "lens shape determinants" 350 include a particular size distribution of marking particles. Additional "lens shape determinants" Include permanence, clarity, color, form, surface roughness, smoothness, color clarity and refractive index. One particular size distribution for the marking particles includes a volume average diameter of 6-12 microns for the first layer and a volume average diameter of 12-30 microns for the second and subsequent layers. Preferred pre-fixing average particle sizes of 14 and 19 microns, measured as described above, produced final fixed three-dimensional shaped lens with an approximate average height of 14 and 19 microns, respectively, using a single layer of clear toner. Multiple layers that are registered can be used to increase the lens height to approximately 100 microns. Final optical elements with curvilinear shapes and heights from 12-100 microns over an image cause that image to appear to be a three-dimensional shape that moves when observed from a variety of angles. The curvilinear shape is roughly parabolic shape as shown as S4 in FIG. 7.

In one embodiment the desired optical element is one that creates a lens that is an optical element that has a power. A power lens has a non-neutral effect on light passing through it, that is the light rays do not remain parallel as they pass through the lens. The optical power of a lens is defined as 1/f so meniscus lenses have zero power and other lenses have positive or negative power if they magnify the image or make it appear smaller. Lens power is measured in dioptres, which are units equal to inverse meters ($m^{-1}$).

Examples include the following and their optional equivalents convex, biconvex, plano-convex, convex-concave, concave, plano-concave, biconcave, meniscus, fresnel lens and prisms of various types as well as other well known lens shapes. These lens shapes are defined by various terminology including radii of curvature ("R"), focal length (f), refractive index (n) of the material that makes them, thickness (d) as well as height, which may include both clear and pigmented toner.

The focal length in air of a lens can be calculated using a lens maker's equation:

$$1/f=(n-1)[1/R_1-1/R_2+(n-1)d/nR_1R_2]; \text{ where}$$

$R_1$=radius of curvature of the lens surface closer to the light source and $R_2$=radius of curvature of the lens surface farthest from the light source.

Alternately if the desired raised multidimensional toner shape does not have a power it may still give a desired effect and be useful in certain circumstances as, for example, as a fresnel lens that is useful in ways well known to those skilled the art.

An optical element that has a power has additional characteristics that are useful when applied to a receiver, with or without associated indicia in registration to the power lens as described above.

An optical element that does not have a power can also be very useful since it can result in a number of visually or tactilely useful results that represent a type of surface characteristic. Examples include an image of a fish in an aquarium where the fish and or the aquarium is partially raised simulating a virtual "underwater" effect. Other uses include a security effect that adds a predetermined multi-dimensional shape including an optical element that has either/or a power and does not have a power. Another useful application is to print indicia that are Braille characters with or without the overspending language characters. It is useful to print the Braille characters in close registration to the language characters in order to allow both sighted and blind individuals to be reading simultaneously the same words and to help with learning one of the two languages. The use of an optical element over two or more languages is also useful for assisting in learning another language since both can be seen at the same time. Even teaching young children could be enhanced with a dual or multi-viewable set of characters or music or images and characters as well as other multi related learning aides. The predetermined multi-dimensional shape can be printed on a surface that allows for removal of the predetermined multi-dimensional shape from the underlying receiver base.

These optical elements could be formed in conjunction with images in photographs, posters, LCD displays, projectors, light pipes and optical waveguides. The optical elements could be used to create optically-variable images with respect to viewing angle and other interesting effects such as sparkling, color-shifting and 3-D images.

Figure 9:
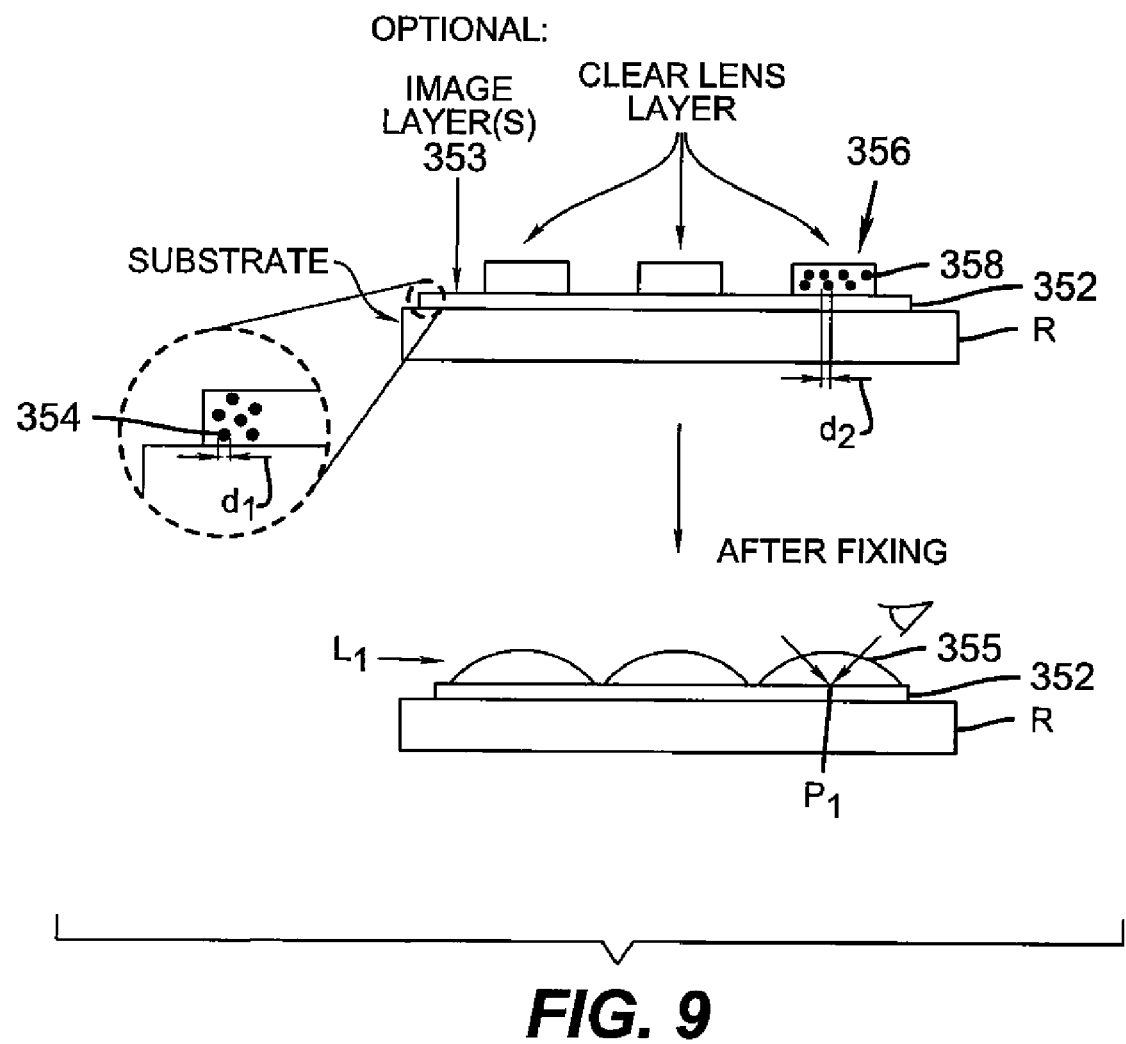
FIGS. 9 and 10 are two schematic side elevational views, in cross section, of a print having the optical element formed thereon and fixed to form the final optical elements shown.

FIG. 9 shows an embodiment where the particular size distribution of marking particles includes a first layer 352 formed from toner 354 having a first volume average diameter "$d_1$" as small as obtainable on that printer for the first layer, which is shown as an optional image layer 353, and a second layer 356 that is formed from clear toner 358 with a volume average diameter "$d_2$" that is larger than the first volume average diameter ("$d_2$"≧"$d_1$") in order to give the final optical element shape $L_1$. In one preferred embodiment the final optical element having a predetermined multi-dimensional shape 355 is formed from a total marking particle stack height of at least 20 μm. The final predetermined multi-dimensional shape 355 is incrementally registered to a first registration pattern or mark ($P_1$) in order to place the optical element relative to the image layer 353 in such a way that if, for instance, the optical element is a curvilinear lens having a refractive index of about 1.6 yields a magnification greater than 1.0 so that when it is placed directly over an image as show in FIG. 9 at P1 it would magnify the image as viewed by observer O.

The optical element also referred to as an optical component L1 shown in FIG. 9 is made from a clear toner 358. The optical component L1 can be centerless or can be centered on an optical axis P1. Examples of centerless optical components include transparent plates and filters having no power. Centered optical component L1 have a power relative to indicia or fiducials or other features that define in optical axis P1 and require alignment of the optical axis P1 with one or more viewer planes P4. The optical axis P1 may be centered relative to the indicia as observed by a viewer from a viewer plane P4 or may be located off-center in a predetermined manner. In particular embodiments, components must be precisely in accurately positioned on the print relative to any registration patterns and/or indicia or fiducials in order to achieve the results required. Centerless components may be oversized and may not need the precise and accurate positioning of a centered component relative to indicia. Alternatively, centerless components may require precise and are accurate positioning if they are to be placed relative to certain lens, such as fresnel lenses. One or more viewpoints P4 through P5 can have optical power. Other viewports can alternatively lack optical power depending on the desired result. If the viewport does not need optical power then that is not a requirement for the final predetermine shape.

Figure 10:
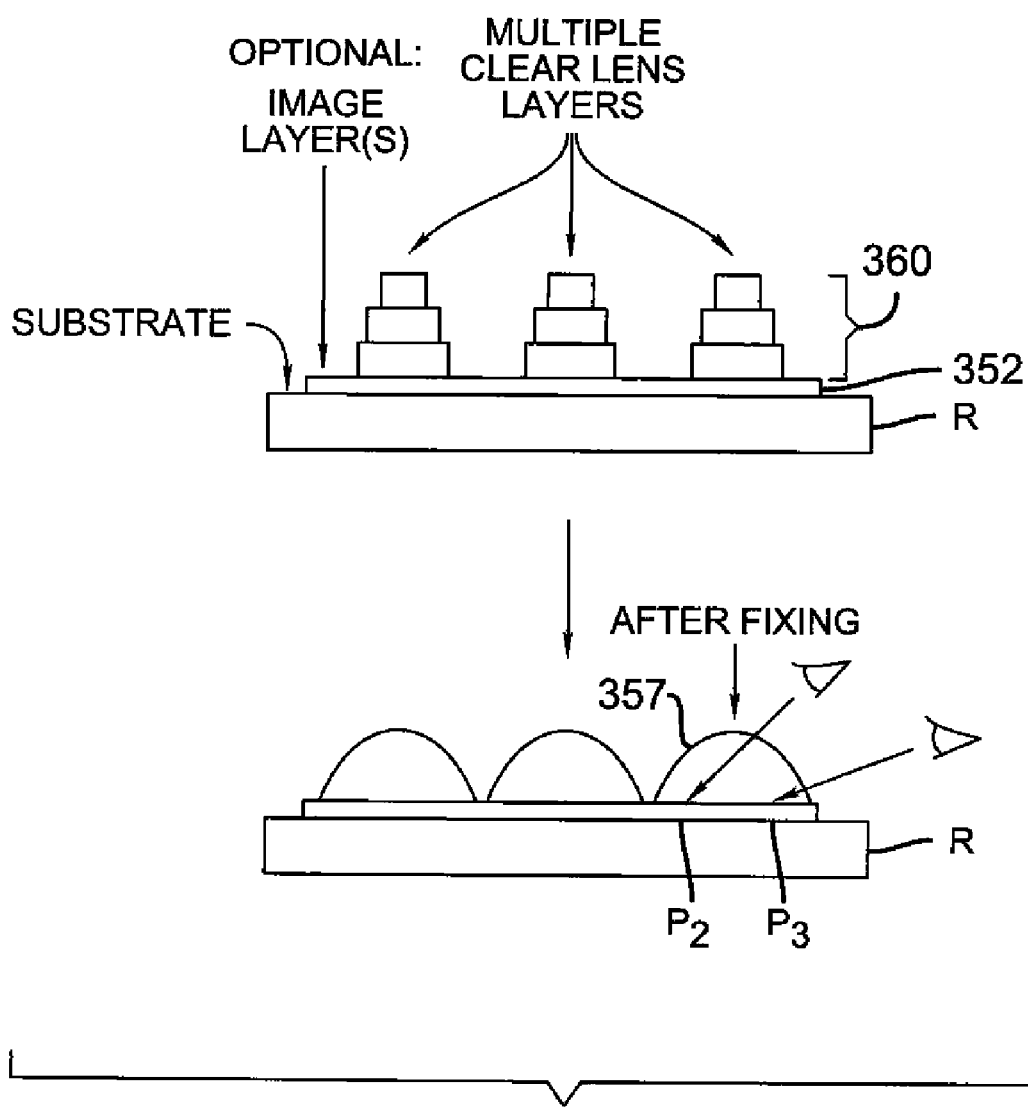

FIG. 10 shows another embodiment with a different focal length where the particular size distribution of marking particles includes the first layer 352 formed from toner 354 having a first volume average diameter "$d_1$" as small as obtainable on that printer for the first layer as discussed above. Alternately this layer could be a clear layer. The second layer 360, which can include multiple sizes and sets of particles with particular size distribution that is formed from clear toner 358 can have a volume average diameter "$d_2$" that is larger than the first volume average diameter ("$d_2$"≧"$d_1$") and includes two or more applications or passes through a module in order to give the final optical element $L_2$ which is steeper and higher then the final optical element $L_1$ described above and shown here as angular for simplicity but which is actually usually curvilinear in nature. The final optical element can be in a periodic pattern that repeats the final optical element as in a lens array and can include one of an elliptical or circular nature having a predetermined index of refraction. The final optical element predetermined multi-dimensional shape 355 is incrementally registered to one or more registration patterns ($P_2$ and $P_3$) in order to place the shape relative to the image layer 353 in such a way that if, for instance, the shape has a magnification greater then 1.0. The final optical element $L_2$ is suitable for multi angular viewing that allows more then one image to be seen if the viewing angle changes.

In the embodiment shown in FIG. 9, the lens element L1 is a lens used for projections. In the embodiment shown in FIG. 10 the lens L2 is used for multi-viewport viewing. L1 and L2 have different optical powers providing for different focusing distance and/or different focal lengths as required for their ultimate uses. Other optical elements could be provided in addition to or in place of one or both of the two lenses L1 and L2 shown in FIG. 9 and FIG. 10. U.S. Pat. No. 5,543,964 entitled "Depth image apparatus and method with angularly changing display information" and assigned to Eastman Kodak discusses some of the various lens shapes and uses that could be made and is incorporated by reference. U.S. Pat. No. 5,543,964 describes an apparatus and method of creating depth images with different depth image scenes being projected at different viewer orientations as is done in FIG. 10. At each of a variety of orientations a different perspective can be provided to the viewer. To provide the different scene or view at the different orientations, different optical elements 355 of different focal lengths, such as L1, are printed over parts of the image.

The printing of different optical elements 355 over an image on the substrate is accomplished by writing to a print file the layers of the predetermined multi-dimensional shapes 355 over the different image content. The present invention has the advantage of being able to print both the image and the lens in the same machine under a single or during multiple passes.

The final optical element having the predetermined multi-dimensional shape 355 can be in a periodic pattern that repeats the final optical element as in a lens array and can include one of an elliptical or circular nature having a predetermined index of refraction. The final optical element L1 is suitable for light directing lens that can focus or disperse light that passes through it depending on the particular final optical element L1 formed. The final pre-determined shape 355 can be used for projection magnification system if the toner used is clear and has a refractive index of almost 1.60 and the receiver is transparent, a filter or translucent as required for the effects desired.

Figure 11:
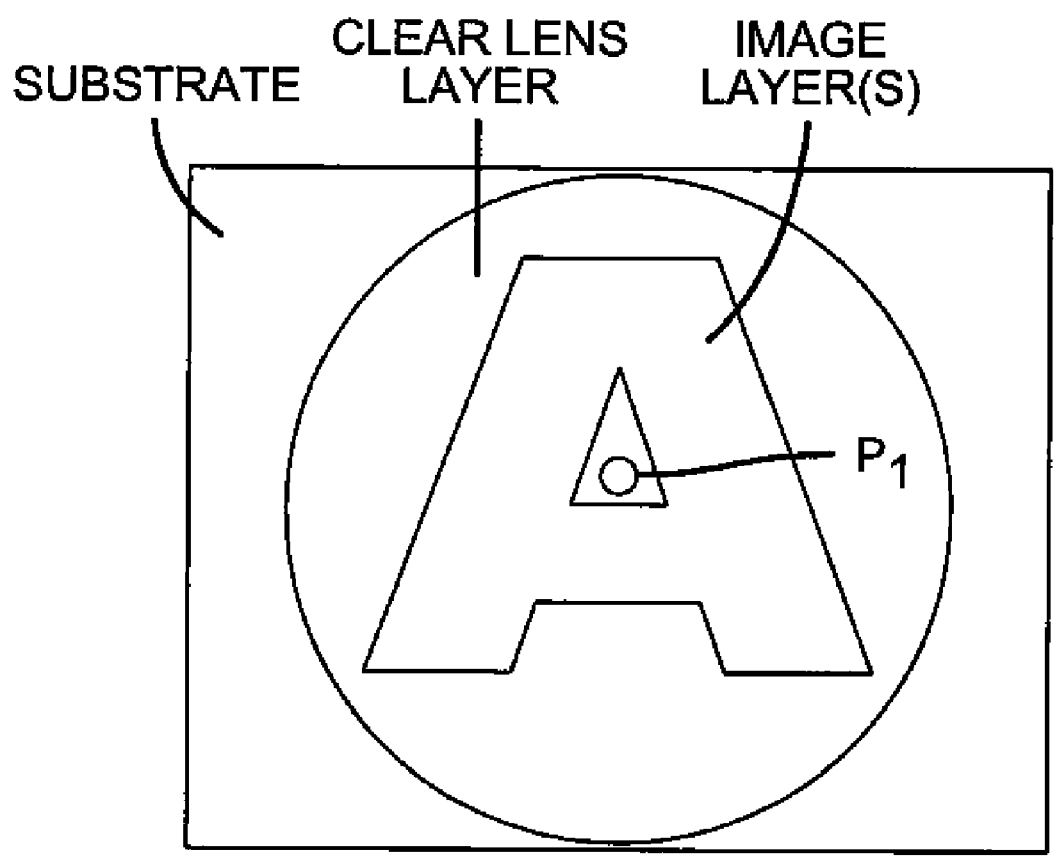
FIGS. 11 and 12 are two prints having a final optical element formed thereon relative to a reference pattern.
Figure 12:
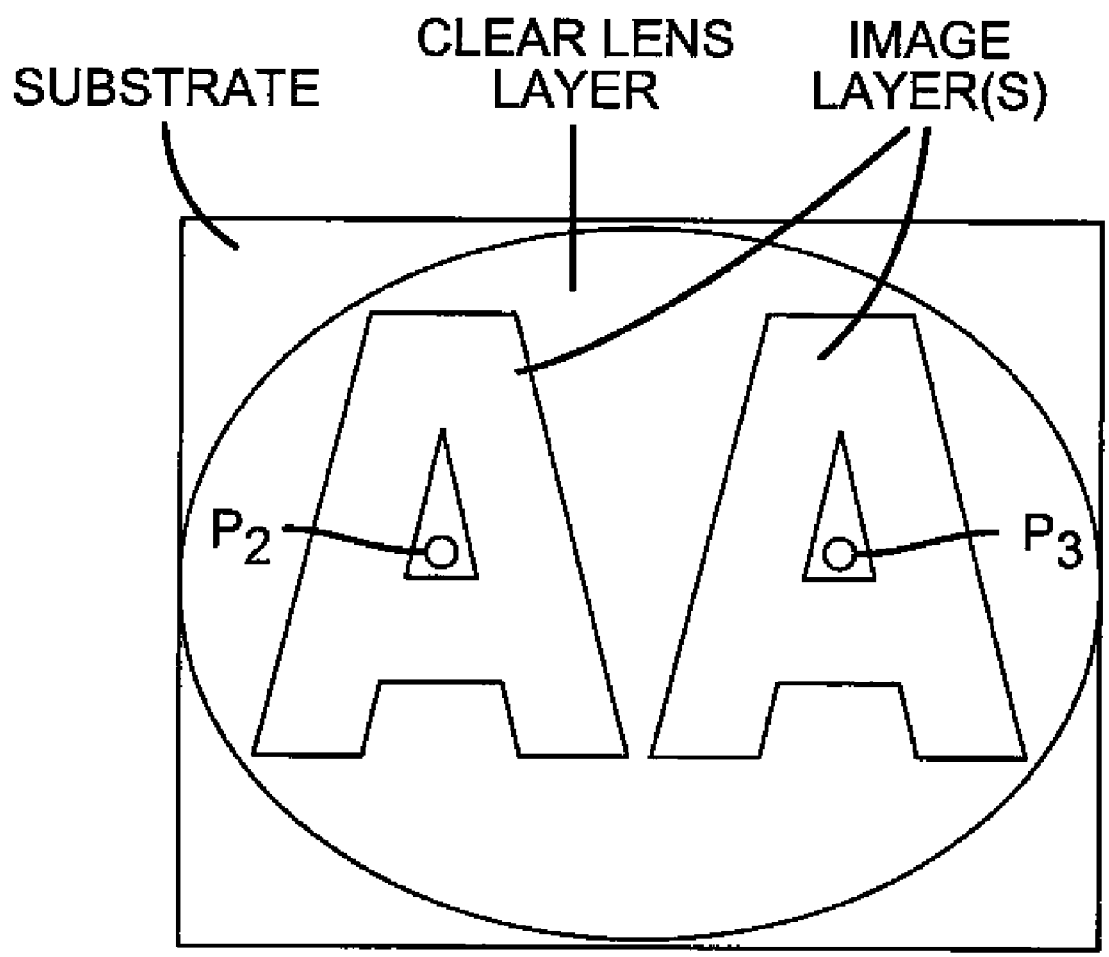

FIGS. 11 and 12 show prints that are formed on the receiver member relative to registration patterns ($P_1$) and ($P_2$ and $P_3$) respectively over one or more image indicia, shown here as one character but which could include a variety of marks and multiples of the same. The registration patterns could also include any of the features shown in FIGS. 13-15 described below.

Figure 13:
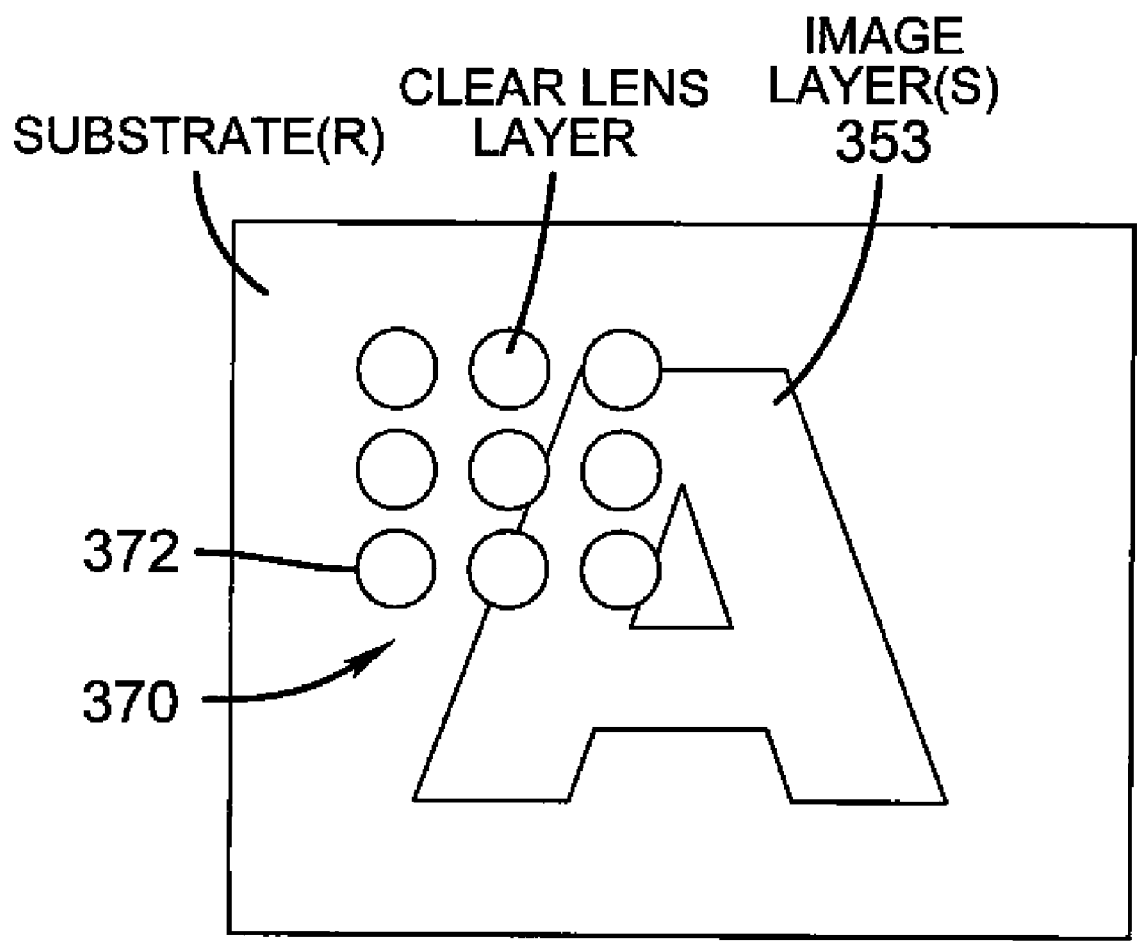
FIGS. 13, 14 and 15 are prints having a final optical element formed thereon relative to a reference pattern.
Figure 14:
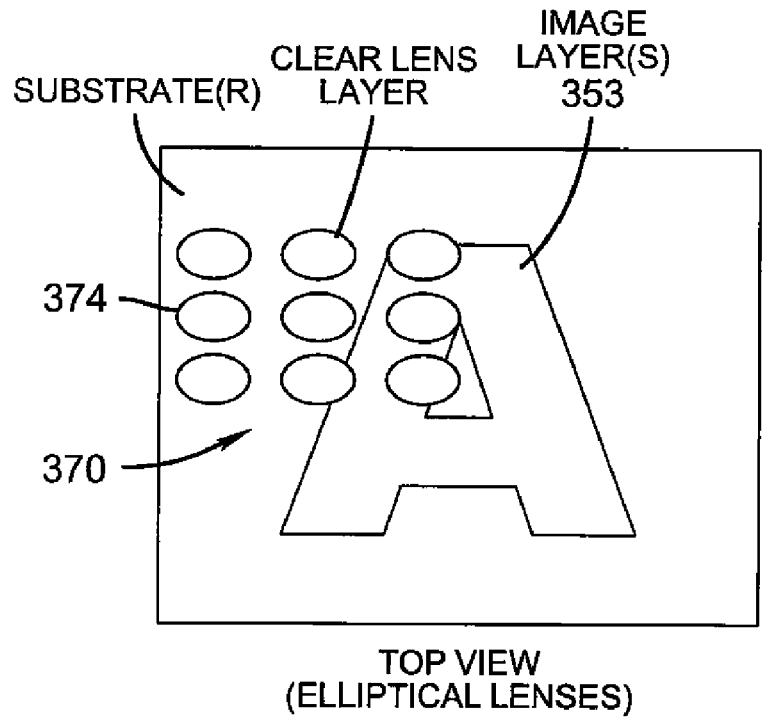
Figure 15:
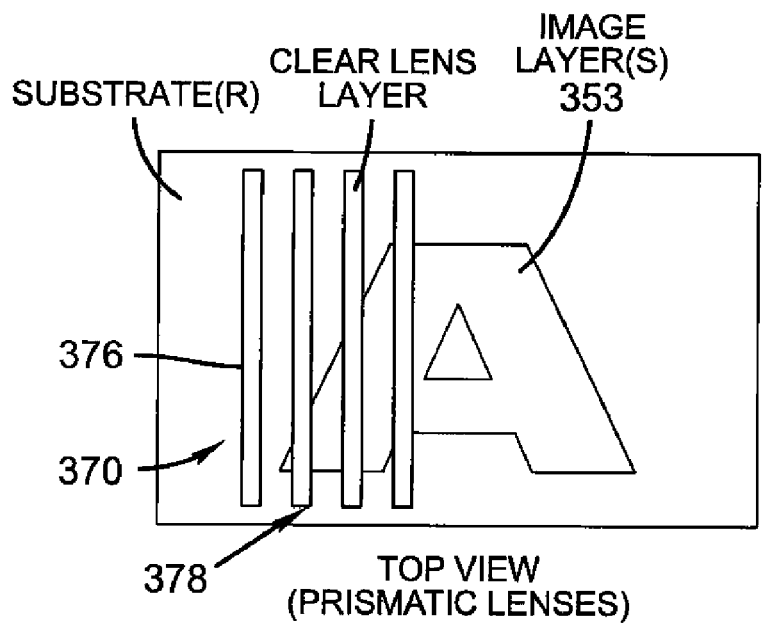
Figure 16:
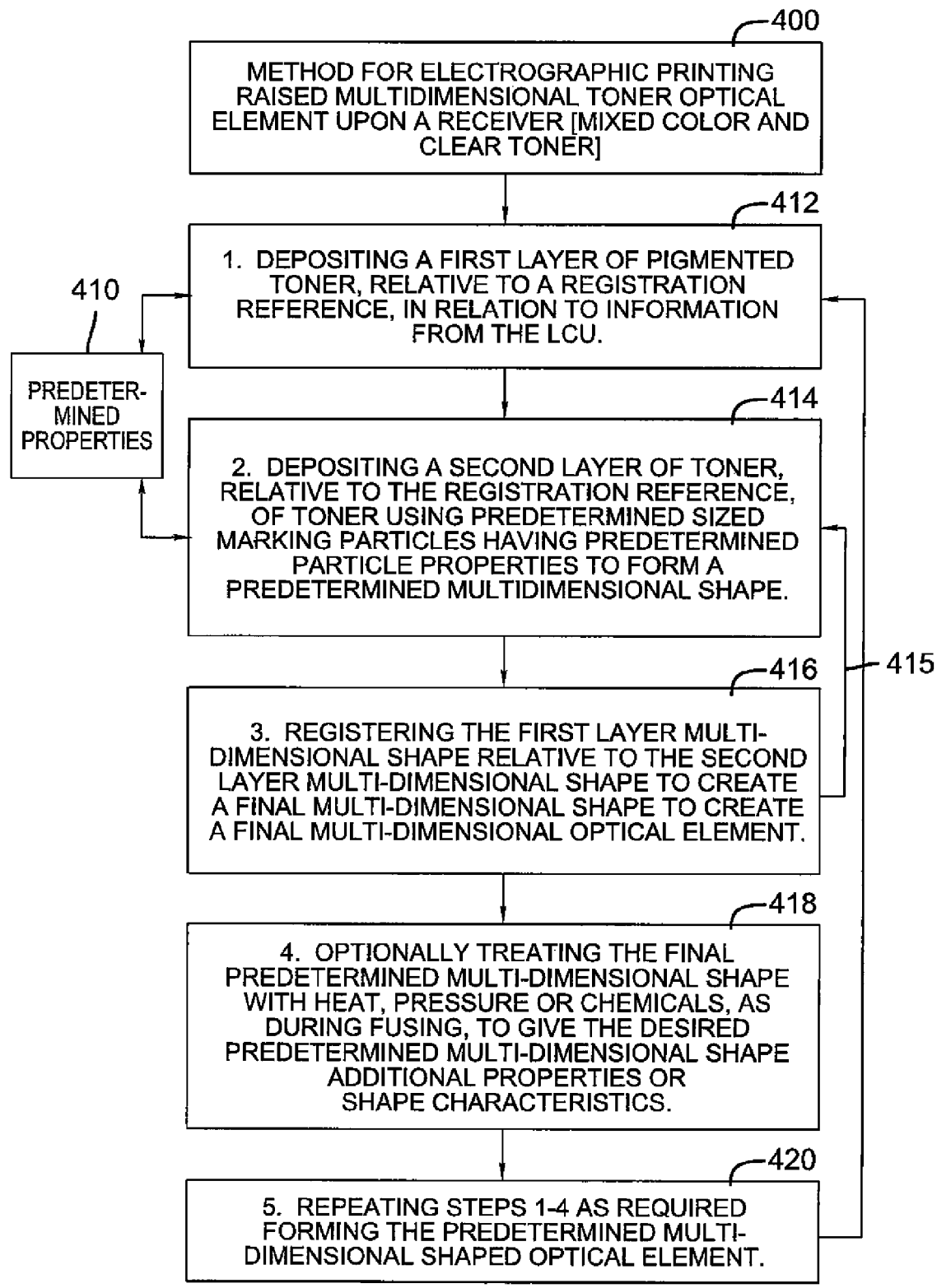
FIG. 16 is an embodiment of a method printing the optical element upon a receiver.

A few prints that are formed on the receiver member are shown in FIGS. 13, 14 and 15, exhibiting a variety of final optical elements, including marking particle coverage on said receiver providing the desired print image and marking particle coverage 370, in areas where final optical element is deposited. FIG. 13 shows a final optical element in the shape of a circle that results in an effective circular lens 372. FIG. 14 shows a final optical element in the shape of an ellipse that results in an effective elliptical lens 374. FIG. 15 shows a final optical element in the shape of a series of parallel lines 376 that are actually "cylindrical" shaped and that result in an effective prismatic lens 378. The final optical element is shown in the foreground of these prints and represents at least a part of the printed image but it could be in the foreground or in the background of the print. Alternatively there need not be any printed image at all if only clear toner is used.

In another embodiment the method 400 for electrographic printing of raised multidimensional toner shapes upon the receiver uses both clear and pigmented toner and allows the printing of a final optical element over an image during the same or subsequent related passes. This positioning of the final optical element as an integrated lenticular image in alignment on a lens array relative to an image form from the pigmented toner in the same or a related pass takes advantage of the close registration available based on the present invention. Specifically, it can be used to print two or more languages on a sheet with a lens array situated so that each language is readable from a vantage pint. This would be useful in packaging or to provide multi-lingual forms for use in business and government, warning labels, etc.

The method includes a first step 412 to deposit a first layer of pigmented toner, relative to a registration reference, in relation to information from the LCU. In a next step 414, and any additional similar steps 415, a second or subsequent layer of toner is deposited, relative to the registration reference pattern, using predetermined sized marking particles having the chosen "lens shape determinants" necessary to form a second part or layer of the optical element. In a third step 416 the first layer multi-dimensional shape is registered relative to the second layer multi-dimensional shape to create a final multi-dimensional shape. Optionally the final optical element may be treated 418 with heat, pressure or chemicals, as during fusing, to give the desired optical element or shape characteristics desired. Steps 1-4 are repeated as required to form the predetermined multidimensional shape 252.

The predetermined particle properties which are also referred to as "lens shape determinants" 350, when referring to the clear toner alone, include the particular size distribution of marking particles. Additional "lens shape determinants" Include permanence, clarity, color, form, surface roughness, smoothness, color clarity and refractive index. One particular size distribution for the marking particles includes a volume average diameter of 6-12 microns for the first layer and a volume average diameter of 12-30 microns for the second and subsequent layers.

In a particular embodiment, pre-fixing average particle sizes of 14 and 19 microns, measured as described above, produced final fixed three-dimensional shaped lens with an approximate average height of 14 and 19 microns, respectively, using a single layer of clear toner. Multiple layers that are registered can be used to increase the lens height to approximately 100 microns. Final shapes with curvilinear shapes and heights from 12-100 microns over an image cause that image to appear to be a three-dimensional shape that moves when observed from a variety of angles. The curvilinear shape is roughly parabolic shape as shown as S4 in FIG. 7.

There are several ways in which additional modules, such as a fourth or fifth image data module, can be used to generate the final optical elements desired. The fifth module image data can be generated by the digital front end (DFE) from original CMYK color data that uses the inverse mask technique of U.S. Pat. No. 7,139,521, issued Nov. 21, 2006, in the name of Yee S. Ng et al. In this case clear toner may not be used. The inverse mask for raised multidimensional toner shapes printing is formed such that any rendered CMYK color pixel value with zero marking values will have a full strength (100%) fifth module pixel value generated. The fifth module image data is then processed with a halftone screen that renders a special shape. Accordingly, the desired final optical elements can be printed on the image (i.e., the foreground) where there is CMYK toner, but not in the background area.

In one alternative embodiment, a DFE can be utilized to store objects type information, such as text, line/graphics, and image types applicable to the rendered CYMK color pixels during raster image processing (RIPping). The fifth module applies a toner layer imaging data will then be generated according to an operator's request to certain types of objects. For example, when only text object type is requested, the DFE will generate fifth image data only on the text object, while other object types will have zero values. This fifth image pixel can then be screened with halftone screens to generate the desired special texture. Here, the final multidimensional toner shape will appear on the text objects while other objects will be normal (non-textured) in appearance.

In another alternative embodiment, the operator selected fifth image spot with special texture appearance is formed on top of CMYK/RGB image objects. The DFE renders fifth channel image data accordingly and sends the data to the press for printing. A special halftone screen (for example, a contone screen) in the press is configured to screen the fifth image data. As a result, the special texture will be printed with a raised appearance that conforms to the operator's choice.

In all of these approaches, a clear toner may be applied on top of a color image or a clear toner to form the final optical elements desired. It should be kept in mind that texture information corresponding to the clear toner image plane need not be binary. In other words, the quantity of clear toner called for, on a pixel by pixel basis, need not only assume either 100% coverage or 0% coverage; it may call for intermediate "gray level" quantities, as well.

The invention has been described in detail with particular reference to certain preferred embodiments thereof, but it will be understood that variations and modifications can be effected within the spirit and scope of the invention. This invention is inclusive of combinations of the embodiments described herein. References to a "particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like are not limiting.

The invention claimed is:

1. A method for electrographic printing of one or more optical elements upon a receiver, said printing comprising the steps of:
   a. depositing a first layer of toner, having first predetermined sized marking particles to form a first layer of a multi-dimensional shape;
   b. depositing a second layer of toner, having second, predetermined sized marking particles of a larger size than the first predetermined sized marking particles to form a second layer of a multi-dimensional shape, relative to the first layer of the multi-dimensional shape; and c. repeating steps a and b as required to form a pattern of the first predetermined sized marking particles and second predetermined sized marking particles having a packing of marking particles controlled to yield, after fusing, a final optical element having a desired multi-dimensional shape through which light can pass to and from the receiver, wherein the light that passes through the optical element is directed according to the multi-dimensional shape of the optical element and an index of refraction of the fused marking particles.

2. Electrographic printing according to claim 1 further registering the first layer multi-dimensional shape relative to the second layer(s) to form an optical element in relation to a registration pattern.

3. Electrographic printing according to claim 1 wherein the predetermined sized marking particles have a particular size distribution of marking particles.

4. Electrographic printing according to claim 3 wherein the particular size distribution of marking particles comprises a volume average diameter greater then 5 microns.

5. Electrographic printing according to claim 1 wherein the particle properties comprise one or more of the following: permanence, clarity, color, form, surface roughness, smoothness, or refractive index.

6. Electrographic printing according to claim 1 wherein the particular size distribution of marking particles comprises a volume average diameter of 6-12 microns for the first layer and a volume average diameter of 12-30 microns for the second layer.

7. Electrographic printing according to claim 1 wherein the particular size distribution of marking particles comprises a first volume average diameter is as small as obtainable on that printer for the first layer and a volume average diameter larger then the first volume average diameter for the second layer shape to give the final optical element.

8. Electrographic printing according to claim 1 wherein predetermined sized marking particles have a volume average diameter of 12-30 μm.

9. Electrographic printing according to claim 1 wherein the final optical element comprises a total marking particle stack height of at least 20 μm.

10. Electrographic printing according to claim 1 further comprising an intermediate layer between the first and second layer of toner.

11. Electrographic printing according to claim 1 wherein the final optical element comprises a periodic pattern.

12. Electrographic printing according to claim 1 wherein the final optical element comprises one of an elliptical or circular nature having a predetermined index of refraction.

13. Electrographic printing according to claim 1 further comprising treating the final optical element to give the final optical element additional properties.

14. An electrostatographic printing apparatus for forming a toner image upon a receiver, the apparatus comprising:
 a. an imaging member;
 b. a development station for depositing two or more layers of toner using each having a different predetermined sized marking particles to form an optical element;
 c. a fuser for fusing the layers of toner;
 d. a registration device for registering the first layer multi-dimensional shape to the second layer multi-dimensional shape;
 e. a controller for controlling the application of each layer to form a pattern of the first predetermined sized marking particles and a second predetermined sized marking particles having a packing of particles controlled to yield, after fusing an optical element having a desired multidimensional shape; and
 f. a treatment device for treating the final optical element to give the final optical element additional properties;
 wherein the light that passes through the optical element is directed according to the multi-dimensional shape of the optical element, an index of refraction of the fused marking particles and the treatment applied to the optical element.

15. The apparatus of claim 14, wherein the predetermined sized marking particles comprises a particular size distribution of marking particles.

16. The apparatus of claim 14, wherein the final optical element comprises specific height, profile including radius of curvature, refractive index.

17. The apparatus of claim 14, wherein the predetermined particle properties comprise one or more of the following: toner viscosity, color, density, surface tension, glass transition temperature (Tg) or melting point.

18. A print on a receiver member, said comprising:
 marking particle coverage on said receiver providing a desired print image, and clear marking particle coverage, in areas of said receiver member where an optical effect is desired, an optical element through which light can pass is formed from clear marking particles fused to the receiver member, wherein the light that passes through the optical element is directed according to the multi-dimensional shape of the optical element and wherein the optical element has a stack height of at least 20 μm.

19. The print on the receiver member according to claim 18 wherein the final optical element is in the foreground of such print and represents at least a part of the printed image.

20. The print on the receiver member according to claim 18 wherein the final optical element is in the background of such print and represents a surface characteristic for the receiver member.

21. The print on the receiver member according to claim 18 wherein the final optical element is in the foreground and background of such print.

22. A method for electrographic printing upon a receiver, said printing comprising the steps of:
 a. depositing a first toner forming a first layer multi-dimensional shape, relative to a registration pattern reference, using predetermined sized clear marking particles having a size greater than 20 microns;
 b. depositing a second toner forming a second layer multi-dimensional shape, relative to the registration patterns, using predetermined sized clear marking particles having a size less than 20 microns and having predetermined particle properties; and
 c. registering the first layer multi-dimensional shape relative to the second layer multi-dimensional;
 d. performing steps a, b, and c as required to form a pattern of the first toner and the second toner having a packing of marking particles arranged so that after fusing, a final optical element having a desired multi-dimensional shape is formed through which light can pass wherein the light that passes is directed relative to the registration pattern according to the desired multi-dimensional shape of the optical element and an index of refraction of the fused clear marking particles.

* * * * *